US006256451B1

(12) United States Patent
Mitsui

(10) Patent No.: US 6,256,451 B1
(45) Date of Patent: Jul. 3, 2001

(54) APPARATUS AND METHOD OF EDITING VIDEO DATA

(75) Inventor: Katsuyuki Mitsui, Sagamihara (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/221,130

(22) Filed: Dec. 28, 1998

(30) Foreign Application Priority Data

Dec. 26, 1997 (JP) .................................................. 9-369393

(51) Int. Cl.[7] ...................................................... H04N 5/93

(52) U.S. Cl. .......................................... 386/52; 386/111

(58) Field of Search ................................... 386/4, 33, 52, 386/64, 111; 345/326–328; 348/467.1, 409.16–413.1, 415.1, 416.1, 699, 700, 701, 705; 375/240.12–240.16, 240.01; 370/538, 543, 487

(56) References Cited

U.S. PATENT DOCUMENTS

| 5,793,431 | * | 8/1998 | Blanchard | 375/240.01 |
| 5,917,830 | * | 6/1999 | Chen et al. | 370/487 |
| 5,959,690 | * | 9/1999 | Toebes, VIII et al. | 348/699 |
| 6,137,834 | * | 10/2000 | Wine et al. | 375/705 |

FOREIGN PATENT DOCUMENTS 8-37640    2/1996   (JP) .

* cited by examiner

*Primary Examiner*—Wendy R. Garber
*Assistant Examiner*—Christopher Onuaku
(74) *Attorney, Agent, or Firm*—Jacobson Holman PLLC

(57) ABSTRACT

Input video data of sequential GOPs (Group of Pictures) coded according to MPEG (Moving Picture Experts Group) standard is edited. The edition is conducted at least at a first edition point and a second edition point of the input video data. The second edition point comes after the first edition point on the time-axis. In the case where the first edition point is located in the midway of a first GOP, decoded are at least a first data portion of the first GOP, the first data portion ranging from the head of the first GOP to the first edition point, and a first entire data of a second GOP followed by the first GOP. On the other hand, in the case where the second edition point is located in the midway of a third GOP that comes after the first GOP on the time-axis, decoded are at least a second data portion of the third GOP, the second data portion ranging from the second edition point to the end of the third GOP, and a second entire data of a fourth GOP that follows the third GOP. The sequential GOPs are constituted by at least the first, second, third and fourth GOPs. The decoded first entire data and first data portion, and the decoded second data portion and second entire data are encoded to form a fifth GOP and a sixth GOP, respectively. The sixth GOP follows the fifth GOP. The fifth and sixth GOPs are put into the sequential GOPs.

5 Claims, 4 Drawing Sheets

1

APPARATUS AND METHOD OF EDITING VIDEO DATA

BACKGROUND OF THE INVENTION

This invention relates to apparatuses and methods of editing video data coded according to MPEG (Moving Picture Experts Group) standard.

Shown in FIG. 1 is a method of editing MPEG video data coded by intraframe coding and interframe predictive coding to splice two bit streams of the MPEG video data of sequential GOPs (Group of Pictures).

The method shown in FIG. 1 is to remove GOPs A4 to B3 and splice bit streams of GOPs A3 and B4, so that continuance is achieved in view of GOP. However, the same value of VBV (Video Buffering Verifier) must be set for the GOPs to achieve continuance in view of VBV. Furthermore, the edition shown in FIG. 1 requires re-encoding to have the same VBV delay for GOPs or closed GOPs in which amount of coded data is constant for each GOP for achieving continuance of VBV delay. This method is thus not capable of splicing bit streams in the midway of a GOP.

Such a method capable of editing bit streams in the midway of a GOP is shown in FIG. 2. Shown in FIG. 2 is to remove bit streams from in the midway of a GOP A4 to the other midway of a GOP B3. The GOPs A4 and B3 each being split into two due to edition are decoded and coded again to form a GOP C.

This method has a drawback, that is, it causes deterioration of decoded pictures corresponding to re-encoded frames due to restriction on amount of codes for frames to be subjected to re-encoding.

In detail splicing two MPEG video data coded by interframe predictive coding, that is, just connecting two data frame by frame, causes pictures to go fuzzy. Furthermore, no continuance of VBV delay on the point of connection (edition) of video data causes overflow or underflow at a decoder input buffer, thus resulting in pictures going fuzzy or a halt on moving pictures. This would happen because the decoder input buffer compensates for variation of data amount per frame of input coded data.

SUMMARY OF THE INVENTION

A purpose of the present invention is to provide an apparatus and a method of editing video data of sequential GOPs coded according to MPEG standard that achieve high quality of edited pictures and prevent overflow or underflow at a decoder input buffer even if edition is made in the midway of a GOP.

The present invention provides an apparatus for editing input video data of sequential GOPs (Group of Pictures) coded according to MPEG (Moving Picture Experts Group) standard, wherein the edition is conducted at least at a first edition point and a second edition point of the input video data, the second edition point coming after the first edition point on time-axis. The apparatus is provided with a decoder, in the case where the first edition point is located in the midway of a first GOP, to decode at least a first data portion of the first GOP, the first data portion ranging from the head of the first GOP to the first edition point, and a first entire data of a second GOP followed by the first GOP, while in the case where the second edition point is located in the midway of a third GOP that comes after the first GOP on the time-axis, to decode at least a second data portion of the third GOP, the second data portion ranging from the second edition point to the end of the third GOP, and a second entire data of a fourth GOP that follows the third GOP, the sequential GOPs being constituted by at least the first, second, third and fourth GOPs. The apparatus further includes an encoder to encode the decoded first entire data and first data portion, and the decoded second data portion and second entire data, thus forming a fifth GOP and a sixth GOP, respectively, the sixth GOP following the fifth GOP. The apparatus also includes means for putting the fifth and sixth GOPs into the sequential GOPs, thus a data portion, of the input video data, that ranges from the first edition point to the second edition point, being removed from the input video data.

Furthermore, the present invention provides a method of editing input video data of sequential GOPs (Group of Pictures) coded according to MPEG (Moving Picture Experts Group) standard, wherein the edition is conducted at least at a first edition point and a second edition point of the input video data, the second edition point coming after the first edition point on time-axis. In the case where the first edition point is located in the midway of a first GOP, decoded are at least a first data portion of the first GOP, the first data portion ranging from the head of the first GOP to the first edition point, and a first entire data of a second GOP followed by the first GOP. On the other hand, in the case where the second edition point is located in the midway of a third GOP that comes after the first GOP on the time-axis, decoded are at least a second data portion of the third GOP, the second data portion ranging from the second edition point to the end of the third GOP, and a second entire data of a fourth GOP that follows the third GOP, the sequential GOPs being constituted by at least the first, second, third and fourth GOPs. The decoded first entire data and first data portion, and the decoded second data portion and second entire data are encoded to form a fifth GOP and a sixth GOP, respectively, the sixth GOP following the fifth GOP. The fifth and sixth GOPs are put into the sequential GOPs, thus a data portion, of the input video data, that ranges from the first edition point to the second edition point, being removed from the input video data.

BRIEF DESCRIPTION OF DRWAINGS

Figure 6:
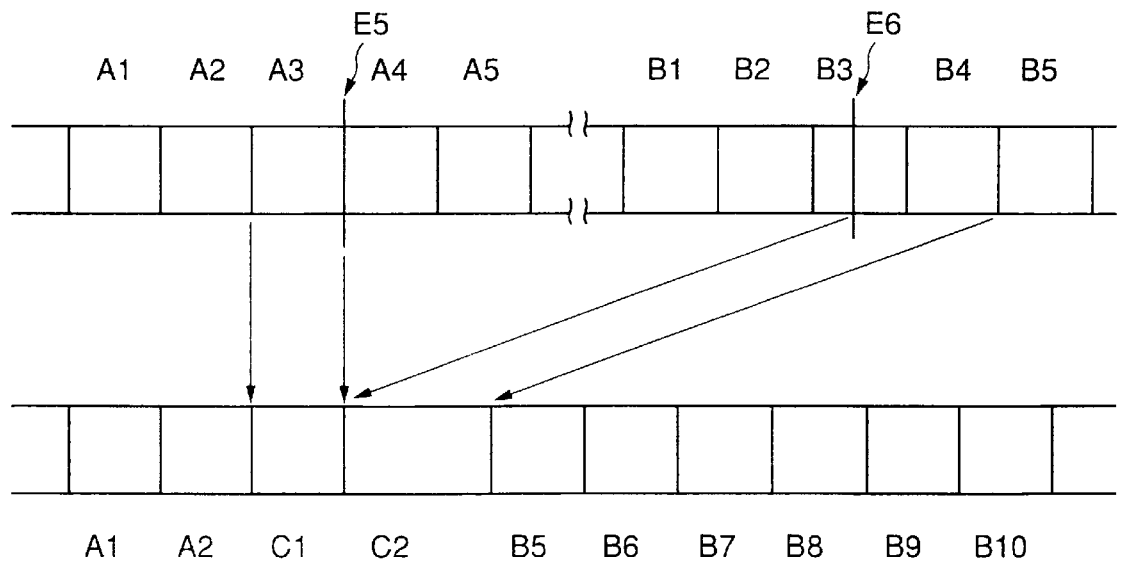

FIG. 6 also shows the editing method according to the invention.

DETAILED DESCRIPTION OF PREFERRED EMBODIMENTS

Preferred embodiments according to the present invention will be described in detail with reference to the attached drawings.

Figure 1:
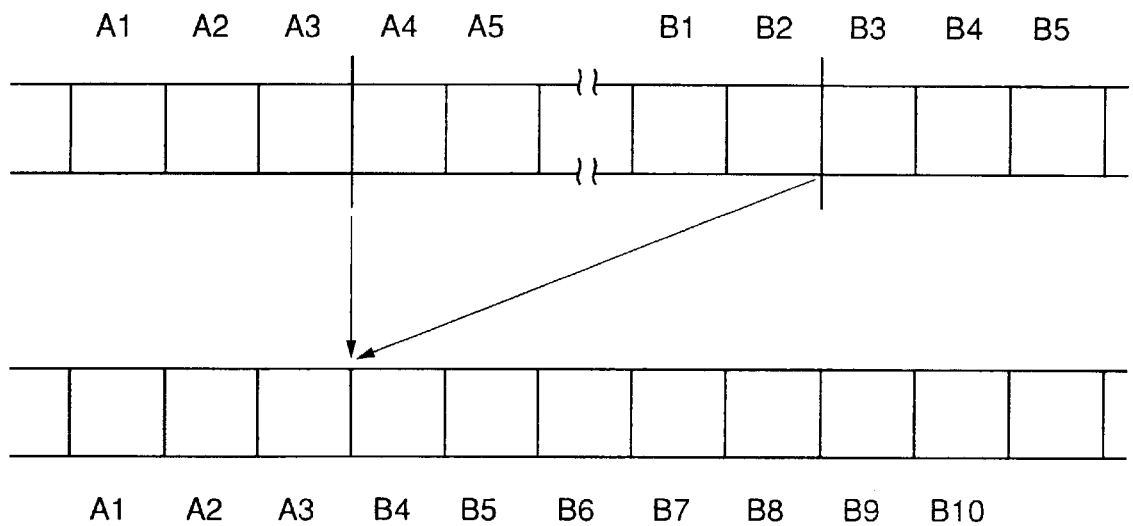
FIG. 1 shows a conventional method of editing MPEG video data to splice two bit streams of the MPEG video data in unit of GOP.
Figure 2:
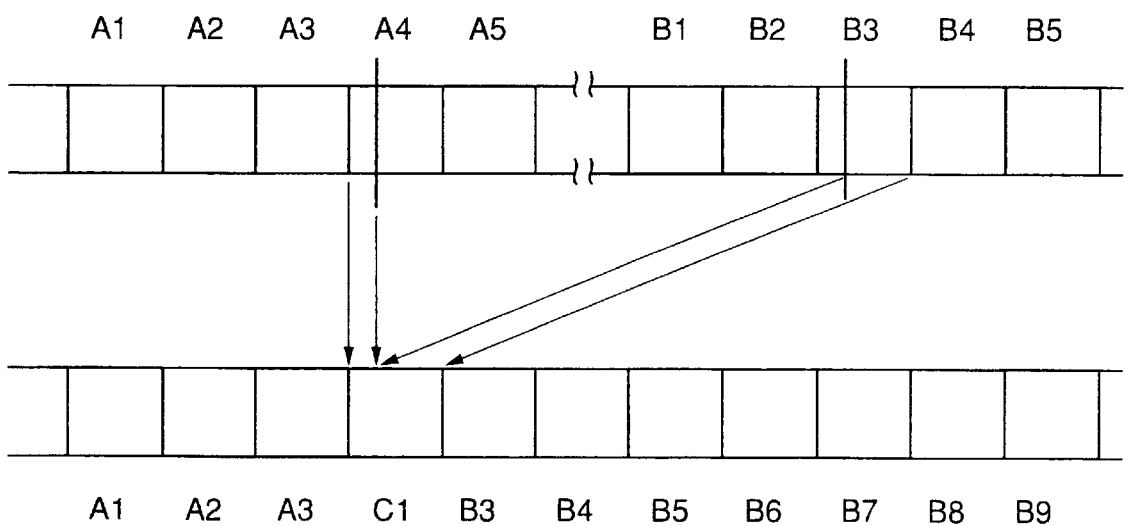
FIG. 2 shows another conventional method of splicing bit streams in the midway of a GOP.
Figure 3:
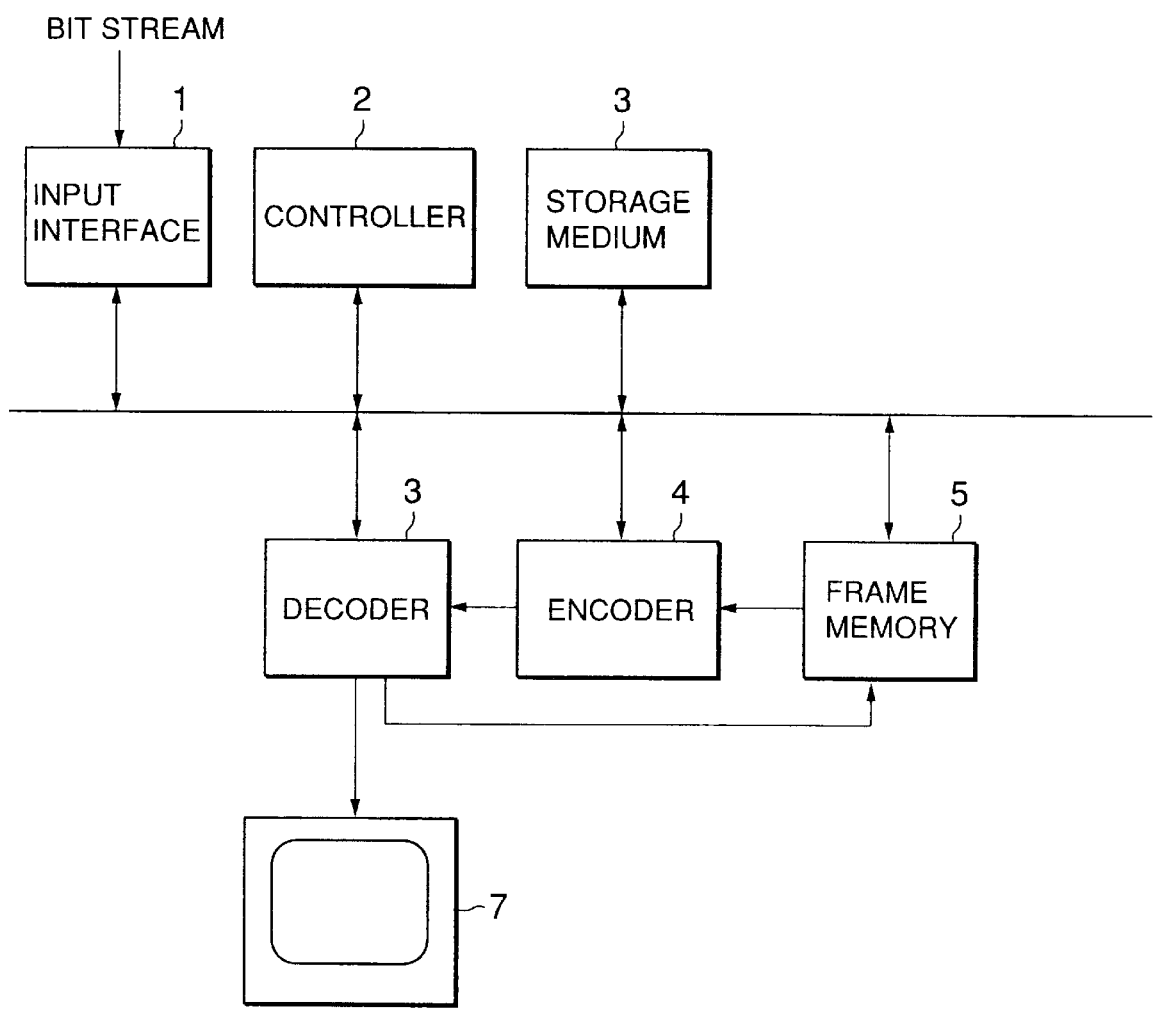
FIG. 3 is a block diagram of a preferred embodiment of an apparatus for editing MPEG video data according to the present invention.

Shown in FIG. 3 is a block diagram of a preferred embodiment of an apparatus for editing MPEG video data coded by intraframe coding and interframe predictive coding according to the present invention. The apparatus is provided with an input interface 1 to which is supplied compressed bit streams of MPEG video data from an external device (not shown), a controller 2 for entire controlling of edition, a decoder 3 to decode the MPEG video data, an encoder 4 to encode the MPEG video data. The apparatus is further provided with a frame memory 5 to temporarily store the decoded MPEG video data for encoding, a storage medium 6, such as a hard disc drive (HDD), to store the input MPEG video data and a monitor 7 to which is supplied the decoded MPEG video data.

Disclosed below is the case where the apparatus edits one bit stream of MPEG video data to remove a stream portion included in the midway of the bit stream.

A bit stream of MPEG video data is input and stored in the storage medium 6 via the input interface 1. The stored bit stream is supplied to the decoder 3 and the decoded bit stream is supplied to the monitor 7.

An operator decides edition points for leaving desired pictures while watching reproduced pictures on the monitor 7. The edition points are a first edition point and a second edition point that comes after the first point on the time-axis.

When the first edition point is in the midway of a GOP, a bit stream of the GOP and another GOP that is followed by the former GOP on the time-axis is decoded by the decoder 3 and stored in the frame memory 5 to form a new GOP. Next, when the second edition point is also in the midway of a GOP, a bit stream of the GOP and another GOP that follows the former GOP on the time-axis is decoded by the decoder 3 and stored in the frame memory 5 to form another new GOP.

The new GOPs are supplied to the encoder 4. The encoder 4 encodes again the GOPs so that a header of the latter of the two continuous GOPs matches the edition points. Furthermore, the encoder 4 is controlled by the controller 2 in order to mainitain continuance of VBV delay on the splicing points between the original bit stream and the two continuous GOPs, thus achieving high quality in reproduced pictures. The edited bit stream is then stored in the storage medium 6.

Figure 4:
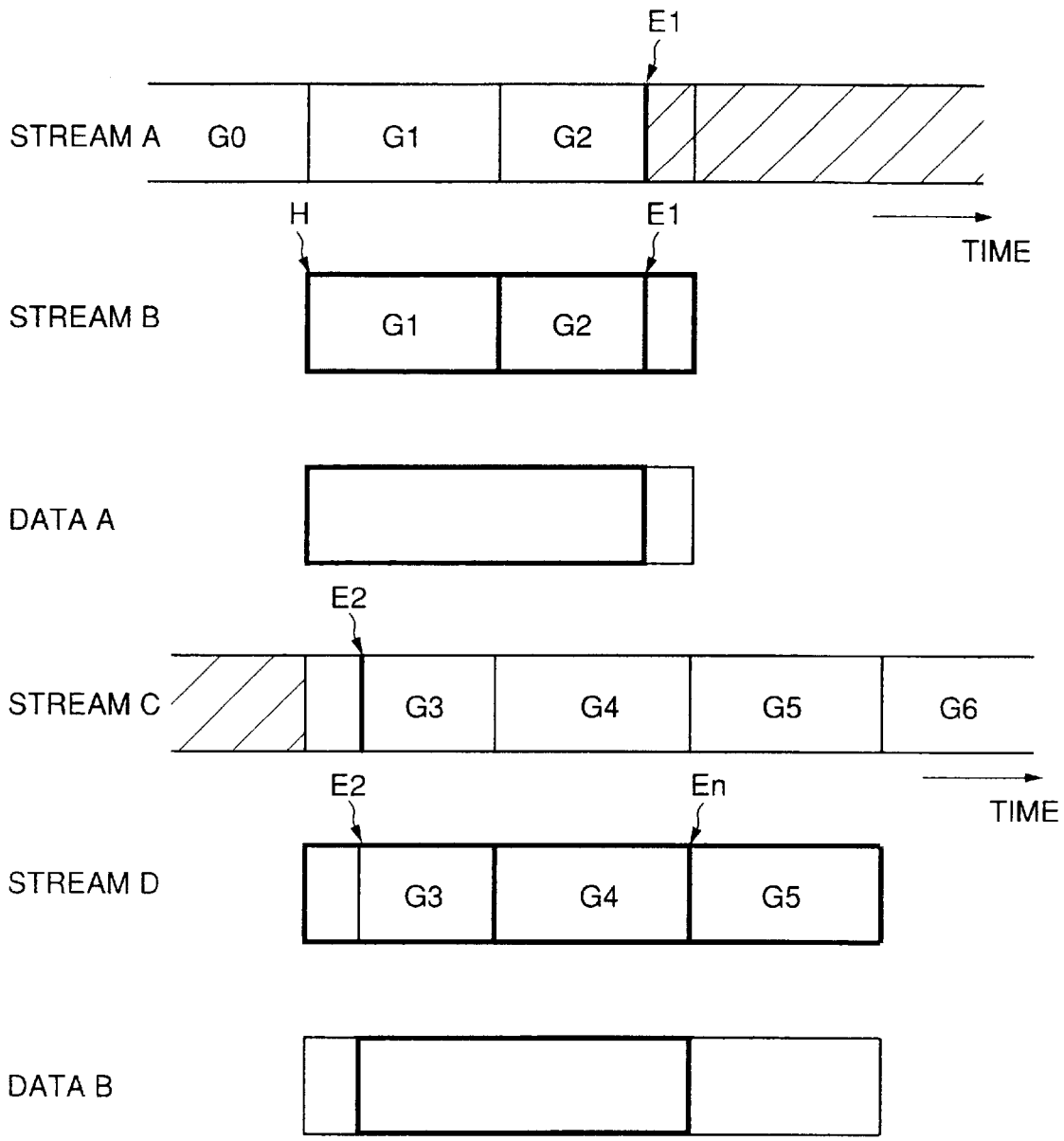
FIG. 4 shows a preferred embodiment of a method of editing MPEG video data according to the present invention.

The edition described above is further disclosed in detail with reference to FIG. 4.

In FIG. 4, an original bit stream STREAM A is followed by another original bit stream STREAM C on the time-axis. An operator decides the first and second edition points E1 and E2 to remove a stream portion depicted by slant lines while watching pictures on the monitor 7, the pictures being reproduced from the original bit streams.

The first edition point El is located in the midway of a GOP G2. A bit stream of a GOP G1 and the GOP G2 that follows the GOP G1 on the time-axis is read from the storage medium 6 and decoded by the decoder 3 as a bit stream STREAM B. A video data DATA A of the decoded bit stream STREAM B, that ranges from the header H of the GOP G1 to the edition point E1 is stored in the frame memory 5.

Next, the second edition point E2 is also located in the midway of a GOP G3. A bit stream of the GOP G3, and GOPs G4 and G5 that follow the GOP G3 on the time-axis and are used for decoding the GOP G3 is read from the storage medium 6 and decoded by the decoder 3 as a bit stream STREAM D. A video data DATA B of the decoded bit stream STREAM D, that ranges from the edition point E2 of the GOP G3 to the end En of the GOP G 4 is stored in the frame memory 5.

The two video data DATA A and B are supplied to the encoder 4 and encoded again. The encoder 4 encodes the video data DATA A and B as the new first and the second GOPs, respectively. As shwon in FIG. 4, the data length of each of the first GOP (DATA A) and the second GOP (DATA B) is longer than the original GOP, such as, the GOPs G2 and G3. This data length depends on the location of an edition point.

In encoding, the controller 2 controls the encoder 4 to encode the first GOP by referring a VBV delay attached to a frame of a GOP GO that is followed by the GOP GI on the time-axis. This achieves continuance of VBV delay. Continuance of GOPs is also achieved by sequentially encoding the first and the second GOPs.

The controller 2 checks a VBV delay attached to the last frame of the second GOP before encoding so that the VBV delay continues another VBV delay attached to the following GOP. The encoder 4 encodes the second GOP using the checked VBV delay as a coding parameter. This also achieves continuance of VBV delay.

The controller 2 further controls the encoder 4 to attach management data to each of the first and the second GOPs so that the bit stream of these GOPs is continuously put into the original bit stream portion that is not encoded again and including frames, such as, the GOPs G0, G5 and G6.

Figure 5:
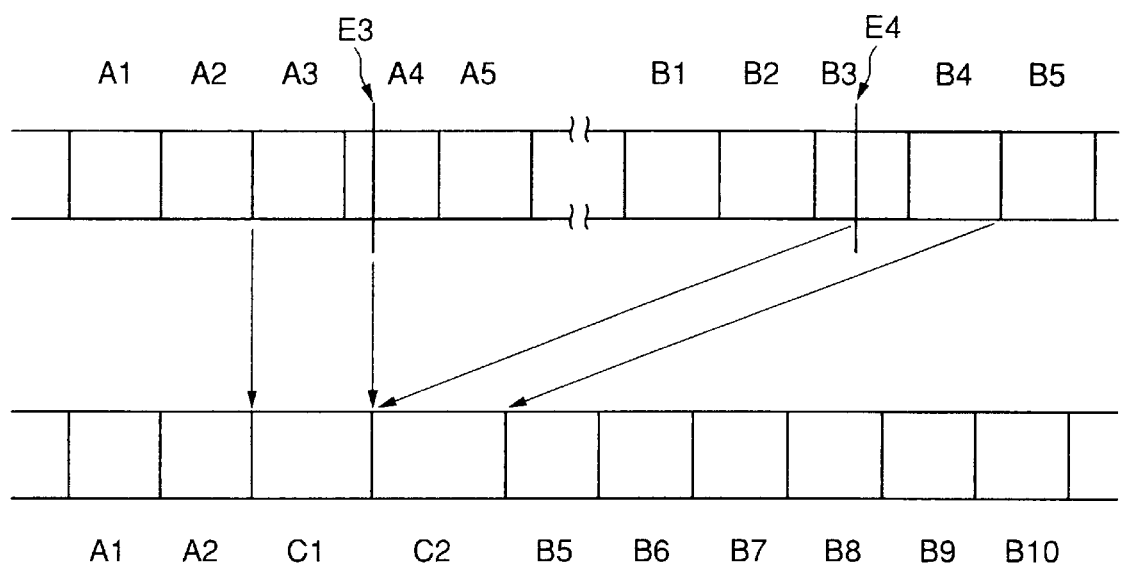
FIG. 5 shows the editing method according to the invention.

FIGS. 5 and 6 show the editing method according to the invention for easier understanding.

Illustrated in FIG. 5 are two edition points E3 and E4 both located in the midway of GOPs A4 and B3, respectively. The same as described above, a GOP A3 and the following GOP A4, and the GOP B3 and the following GOP B4 are decoded and encoded again to form new GOPs C1 and C2. The new GOPs are then put into the original bit stream.

As shown in FIG. 5, the data length of each of the GOPs C1 and C2 is longer than the original GOP, such as, the GOPs A4 and B3. The data length depends on the location of an edition point. The formation of variable-length GOPs achieves high quality of edited pictures and prevents overflow or underflow at a decoder input buffer even if edition is made in the midway of a GOP.

Shown in FIG. 6 is the case where an edition point E5 is located on the border between GOPs A3 and A4 while another edition point E5 is located in the midway of a GOP B3. The GOP A3, and the GOP B3 and the following GOP B4 are decoded and encoded again to form new GOPs C1 and C2. The new GOPs are then put into the original bit stream.

In addition to the above advantages with respect to FIG. 5, when the edition point E5 located on the border between GOPs A3 and A4 is set to match the timing of scene change, this further achieves high quality of edited pictures.

What is claimed is:

1. An apparatus for editing input video data of sequential GOPs (Group of Pictures) coded according to MPEG (Moving Picture Experts Group) standard, wherein the edition is conducted at least at a first edition point and a second edition point of the input video data, the second edition point coming after the first edition point on time-axis, the apparatus comprising:

a decoder, in the case where the first edition point is located in the midway of a first GOP, to decode at least a first data portion of the first GOP, the first data portion ranging from the head of the first GOP to the first edition point, and a first entire data of a second GOP followed by the first GOP, while in the case where the second edition point is located in the midway of a third GOP that comes after the first GOP on the time-axis, to decode at least a second data portion of the third GOP, the second data portion ranging from the second edition point to the end of the third GOP, and a second entire data of a fourth GOP that follows the third GOP, the sequential GOPs being constituted by at least the first, second, third and fourth GOPs;

an encoder to encode the decoded first entire data and first data portion, and the decoded second data portion and second entire data, thus forming a fifth GOP and a sixth GOP, respectively, the sixth GOP following the fifth GOP; and means for putting the fifth and sixth GOPs into the sequential GOPs, thus a data portion, of the input video data, that ranges from the first edition point to the second edition point, being removed from the input video data.

2. The apparatus according to claim 1, further comprising:

a storage medium to store the input video data of sequential GOPs; and a controller to read the first data portion, the first entire data, the second data portion and the second entire data from the storage medium and supply the read entire data and data portions to the decoder.

3. The apparatus according to claim 1, further comprising:

a storage medium to store the decoded first entire data and first data portion, and the decoded second data portion and second entire data; and a controller to read the decoded first entire data and first data portion, and the decoded second data portion and second entire data from the storage medium and supply the read entire data and data portions to the encoder.

4. The apparatus according to claim 1, wherein the encoder attaches management data to each of the fifth and sixth GOPs, the management data indicating that the fifth and sixth GOPs are data to be put into the sequential GOPs instead of the data portion that ranges from the first to the second edition point.

5. A method of editing input video data of sequential GOPs (Group of Pictures) coded according to MPEG (Moving Picture Experts Group) standard, wherein the edition is conducted at least at a first edition point and a second edition point of the input video data, the second edition point coming after the first edition point on time-axis, the method comprising the stpes of:

decoding, in the case where the first edition point is located in the midway of a first GOP, at least a first data portion of the first GOP, the first data portion ranging from the head of the first GOP to the first edition point, and a first entire data of a second GOP followed by the first GOP, while in the case where the second edition point is located in the midway of a third GOP that comes after the first GOP on the time-axis, at least a second data portion of the third GOP, the second data portion ranging from the second edition point to the end of the third GOP, and a second entire data of a fourth GOP that follows the third GOP;

encoding the decoded first data portion and the first entire data, and the decoded second data portion and the second entire data, thus forming a fifth GOP and a sixth GOP, respectively, the six GOP following the fifth GOP; and putting the fifth and six GOPs into the sequential GOPs, thus a data portion, of the input video data, that ranges from the first edition point to the second edition point, being removed from the input video data.

* * * * *